SPIRAL BINDER APPLYING MACHINE

Original Filed March 17, 1966 4 Sheets-Sheet 1

INVENTOR.
Claus Ostermeier
BY
Harness, Dickey & Pierce
ATTORNEYS

SPIRAL BINDER APPLYING MACHINE

Original Filed March 17, 1966 4 Sheets-Sheet 2

INVENTOR.
Claus Ostermeier
BY
Harness, Dickey & Pierce
ATTORNEYS.

SPIRAL BINDER APPLYING MACHINE

Original Filed March 17, 1966 4 Sheets-Sheet 3

INVENTOR.
Claus Ostermeier
BY
Harness, Dickey & Pierce
ATTORNEYS

SPIRAL BINDER APPLYING MACHINE

Original Filed March 17, 1966 4 Sheets-Sheet 4

INVENTOR.
Claus Ostermeier
BY
Harness, Dickey & Pierce
ATTORNEYS.

United States Patent Office

Re. 26,929
Reissued June 30, 1970

26,929

SPIRAL BINDER APPLYING MACHINE

Claus Ostermeier, Waterford, Mich., assignor to Hans Sickinger Co., West Bloomfield Township, Mich., a corporation of Michigan Original No. 3,378,046, dated Apr. 16, 1968, Ser. No. 535,154, Mar. 17, 1966. Application for reissue Apr. 28, 1969, Ser. No. 822,077
Int. Cl. B21f *45/00*
U.S. Cl. 140—92.94 9 Claims

Matter enclosed in heavy brackets [ ] appears in the original patent but forms no part of this reissue specification; matter printed in italics indicates the additions made by reissue.

*ABSTRACT OF THE DISCLOSURE*

*A machine for inserting spiral wire binders in packs of sheets. The pack is supported between two slotted elongated members at least one of which has a guide roller rotated to advance the spiral wire through the slots. A contact engageable by the wire after passing through the pack stops the wire feed.*

This invention relates to spiral binder applying machines, and more particularly to machines for inserting spiral wire binders in pack of sheets and covers having perforated edges.

It is an object of the invention to provide a novel and improved machine of this type which will securely hold the pack of sheets and covers along the perforated areas in which the binder is being inserted, so that accuracy and reliability of the binder insertion process will be assured.

It is another object to provide a novel and improved machine of this character which has a greatly simplified loading and unloading arrangement and can be operated at a much faster rate than previous machines of this type.

It is a further object to provide an improved machine of this nature which is of simplified construction, requires relatively little maintenance and is easily adjustable for various sizes of spiral binders.

It is another object to provide an improved apparatus of this character in which the feed and cycle control are automatically governed by the position of the spiral binder itself.

Other objects, features and advantages of the present invention will become apparent from the subsequent description and the appended claims, taken in conjunction with the accompanying drawings, in which:

Figure 1:
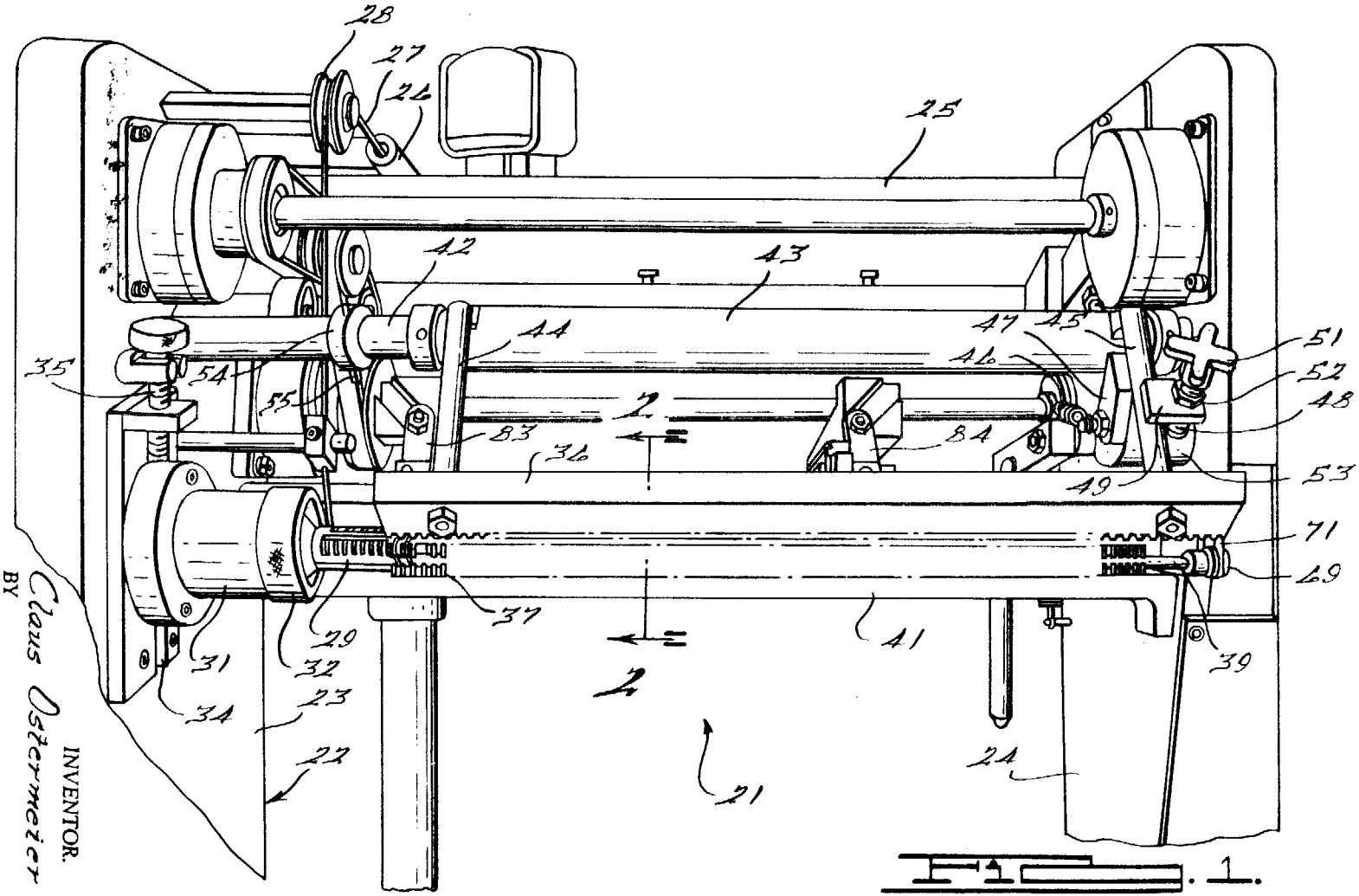
FIGURE 1 is a front elevational perspective view showing the apparatus of this invention, the forward guide roller support being in its retracted position.

Briefly, the illustrated embodiment of the invention comprises a pair of elongated members of rectangular cross-sectional shape, these two members rotatably supporting a pair of guide rollers for a spiral wire binder which issues from a coiling tool body. The two elongated members have series of slots on their facing surfaces, the guide rollers being so mounted that they are partially exposed by the slots. One guide roller support is fixed during use and the other is swingably mounted for movement between a retracted position away from the first support and a clamping position adjacent the first support. In the clamping position, the two flat but slotted facing surfaces of the guide roller supports will clamp a pack of sheets and covers securely therebetween, just along the areas where this pack has perforations for the reception of a spiral wire binder. Means are provided on the stationary guide roller support for preliminary mounting the pack so that the perforations will form curved paths to receive the spiral as it is fed.

As the spiral wire is fed, it will pass into and out of successive slots in the two guide roller supports, the spiral being driven by the rotating guide rollers themselves. The pack will be held immobile by being gripped between, above and below the perforations. After the wire is fed through and cut, the swingable guide wire roller support will be retracted, releasing the pack.

The means for [preliminary] *preliminarily* locating the pack comprises a hook mounted at one end of the fixed guide roller support, and if desired, a locating member mounted at the other end of this support.

As another feature of the invention, switch means are mounted on the fixed guide roller support and are contacted by the spiral wire as it completes its feeding movement. The spiral wire and the switch means are mounted in a circuit which will cause the wire feed to stop when this contact is made and carry out other actions forming the end of the cycle.

Referring more particularly to the drawings, the machine is generally indicated at 21 and comprises a frame generally indicated at 22 adapted to rest on the floor. This frame has left hand and right hand upright side plates 23 and 24 between which are disposed the main machine components. These side plates are secured together by appropriate cross members such as the upper member 25, indicated in FIGURE 1. A wire guide tube 26 is secured to the upper portion of frame 21 adjacent the left hand end thereof, this tube being horizontally disposed and adapted to guide a wire 27 that is fed from a spool (not shown) to the rear of the machine. A pulley 28 is secured to plate 23 forwardly of tube 26 and aligned therewith. From pulley 28 the wire is led downwardly toward a wire coiling tool 29.

Coiling tool 29 is of conventional construction and need not be described in detail. A number of interchangeable coiling tools are provided for different spiral diameters, and the coiling tool is removably mounted on a coiling tool body 31 by a knurled nut 32. The coiling tool has a mandrel surrounded by a slotted member, the wire entering the slotted member at the left hand end thereof, and being coiled by the mandrel, exiting at the right hand end of the tool in the form of a spiral wire which, as it turns, will pass successively through a series of holes in a package of sheets and covers 33 (FIGURES 2 and 9) which are held in alignment therewith by the novel means described below.

Coiling tool body 31 is shown as being mounted on left hand side plate 23 by an adjustable means, including an inclined slot 34 and an adjusting screw 35, so that it may be adjusted to different positions for different sizes of spiral wires. This adjusting means is shown and described in greater detail in my copending application Ser. No. 503,704, filed Oct. 23, 1965, and entitled, "Spiral Binder Applying Machine."

Figure 2:
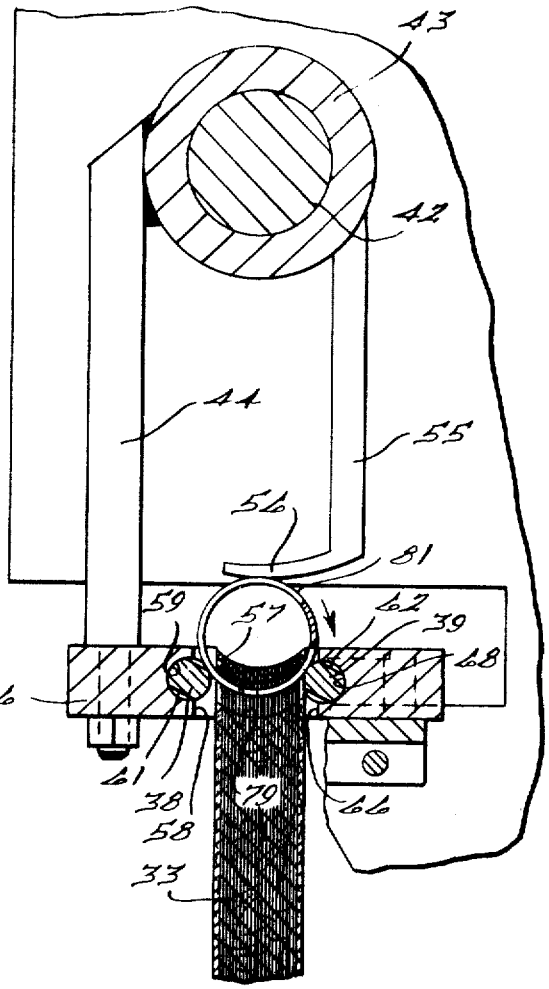
FIGURE 2 is a cross-sectional view in elevation taken along the line 2—2 of FIGURE 1 but showing the forward guide roller support in its clamping position.

The means for clamping pack 33 in position and guiding the spiral binder includes a forward guide roller support member 36, a rear guide roller support member 37, a forward guide roller 38 rotatably mounted within member 36 and a rear guide roller 39 rotatably mounted within member 37 (FIGURE 2).

Guide roller support members 36 and 37 are of elongated shape and have rectangular cross sections. Rear guide roller support member 37 is mounted on a platform 41 which extends between the left and right hand side plates 23 and 24 (FIGURE 1). The left hand end of member 37 is adjacent the exit of coiling tool 29 and its right hand end is adjacent plate 24. Preferably, member 37 is secured to support 41 by means (not shown) which permit horizontal adjustment of this member toward the front or rear of the machine, and to the left and right.

Rear guide roller support 36 is mounted for swinging movement by a rockable shaft 42 which is disposed above and parallel to coiling tool 29, and extends between side plates 23 and 24 (FIGURE 1).

A sleeve 43 is fixedly mounted on shaft 42 and carries a pair of arms 44 and 45 at opposite ends thereof, member 36 being secured to the outer ends of these arms. Member 36 is swingable between a retracted position shown in FIGURE 1, and a clamping position shown in FIGURE 2. In its retracted position, the member 36 is spaced forwardly from member 37, giving sufficient space for an operator to place the perforated edge of a pack 33 against the forward face of member 37. When in its clamping position, member 36 will engage pack 33, clamping it against member 37.

The means for actuating member 36 between its positions comprises a helical coil tension spring 46 having one end secured to frame 22 and the other end secured to an arm 47 on sleeve 43 (FIGURE 1). A screw 48 is carried by a bracket 49 on arm 45, this screw being adjustable by a handle 51 and being securable in position by a lock nut 52. Spring 46 urges the rearward end of screw 48 against a cam 53 which is rotatable by means (not shown) in synchronism with the other parts of the apparatus. With cam 53 in its FIGURE 1 position, member 36 will be in its retracted position, but when cam 53 rotates, it will permit spring 46 to pull member 36 to its clamping position.

Figure 4:
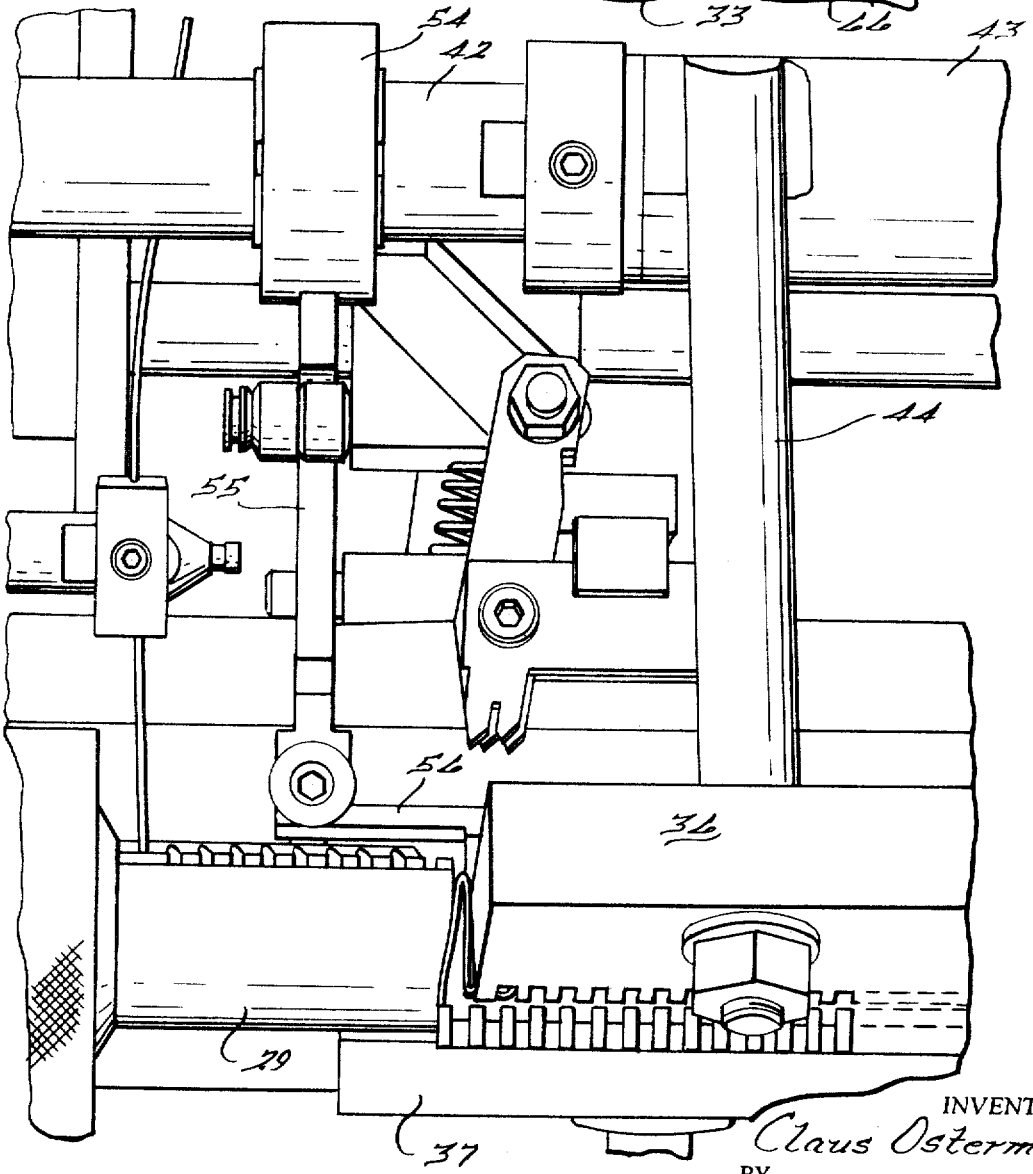
FIGURE 4 is a fragmentary perspective view of the forward portion of the machine showing the manner in which the top guide member is supported.
Figure 5:
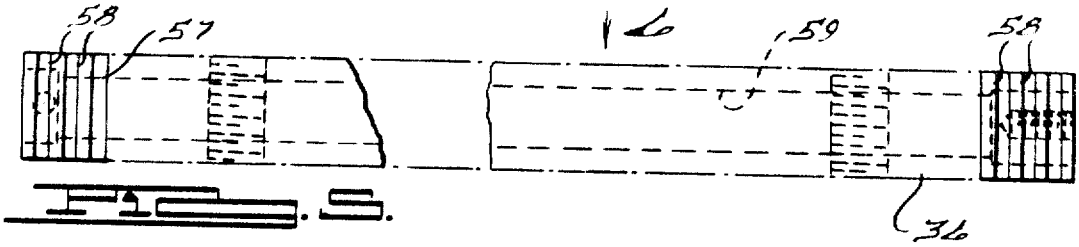
FIGURE 5 is an elevational view of the forward guide roller support, showing the slots for guiding the spiral wire.
Figure 6:
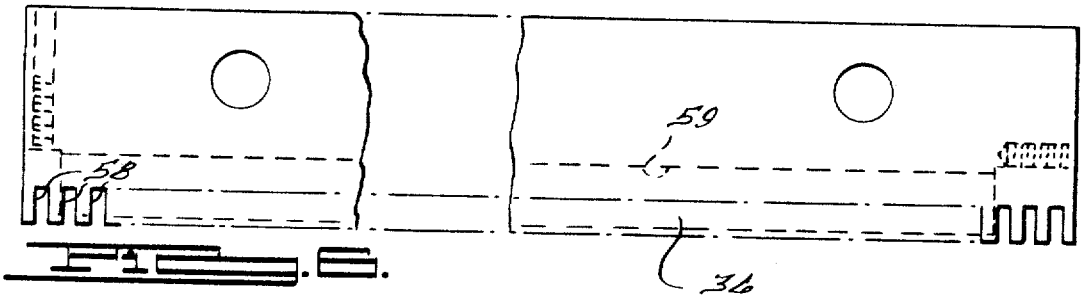
FIGURE 6 is a top plan view of this support.

A sleeve 54 is also secured to shaft 42 and carries an arm 55, at the lower end of which is a shoe 56 (FIGURES 2 and 4). This shoe is disposed over the exit of tool 29 and will, when in its operative position, prevent undue upward movement of the spiral wire as it leaves the coiling tool.

The construction of guide roller supports 36 and 37 is shown in FIGURES 5 through 8. Forward guide roller support 36 has a flat rearwardly facing surface 57 which is interrupted by a series of vertical slots 58 along the entire length of the member. The depth of these slots is such that they communicate with a bore 59 extending through the member. Bore 59 carries forward guide roller 38, as seen in FIGURE 2. This guide roller and guide roller 39 are adapted to drive the spiral wire as it passes through the perforations in pack 33. Preferably, one or more flat areas 61 are provided on roller 38, and similar flat areas 62 are provided on roller 39. The purpose of these flat areas is to periodically relieve the forces on the spiral wire during its advancing movement, thereby minimizing the possibility of the leading end of the wire snagging on the pack or otherwise encountering resistance due to inordinate frictional or other forces.

Figure 10:
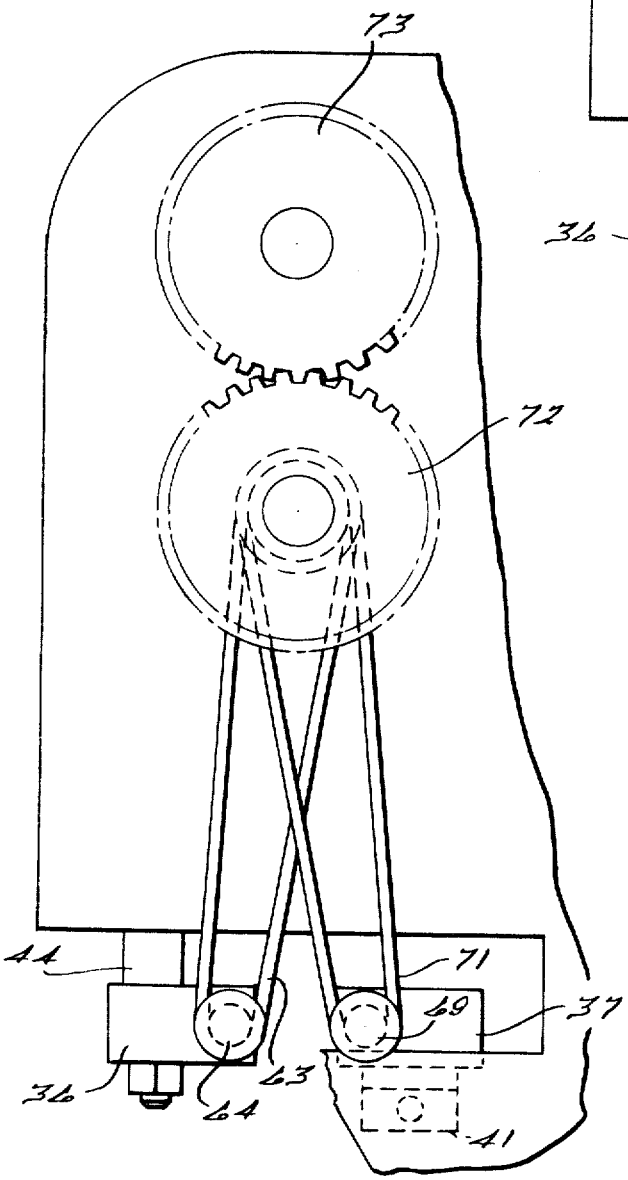
FIGURE 10 is a side elevational view of the right hand end of the machine showing the driving means for the forward and rear guide rollers.

Roller 38 is rotatably supported by member 36, and is driven by a belt 63, seen in FIGURE 10, through a pulley 64 mounted on the right hand end of roller 38 as one faces the machine. The diameter of shaft 38 is such that its outer surface does not extend beyond the rearwardly facing surface 57 of member 36, so that surface 57 is permitted to engage pack 33 along its entire area except where it is broken by slots 58.

Figure 7:
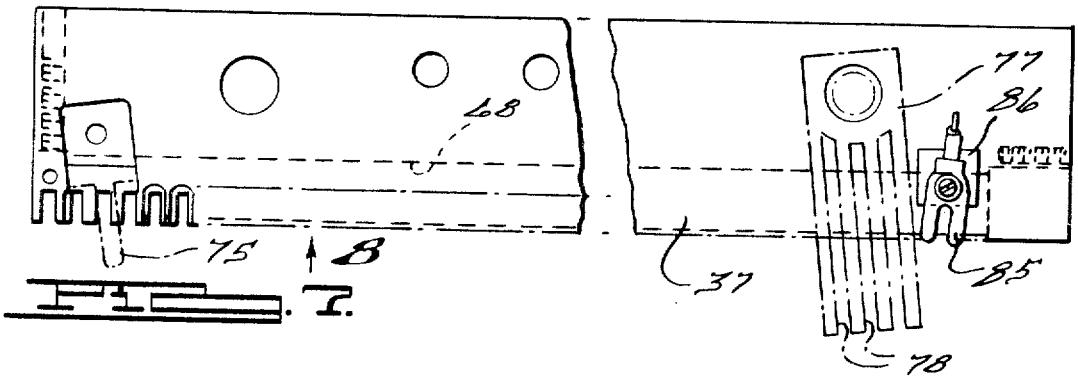
FIGURE 7 is a top plan view of the rear guide roller support.
Figure 8:
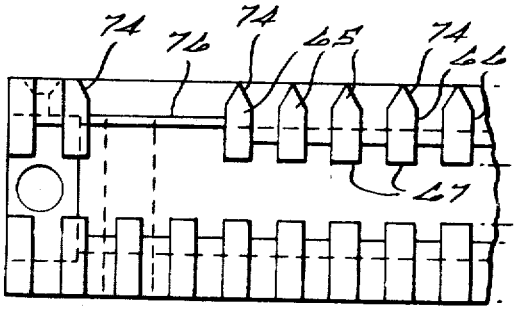
FIGURE 8 is an elevational view of a portion of the rear guide roller support taken in the direction of the arrow 8 of FIGURE 7.

Member 37 is shown in FIGURES 7 and 8, and, like member 36, extends from the exit of tool 29 toward the right hand end of the machine. Member 37 comprises a flat forwardly facing surface 65 interrupted by a series of vertical slots 66 along its entire length, but also interrupted by a horizontal slot 67. Both slots 66 and 67 communicate with a bore 68 which rotatably supports rear guide roller 39. Like the forward guide roller, the outer surface of the rear guide roller does not extend beyond surface 65 so that this entire surface, except as interrupted by slots 66 and 67, may engage pack 33 for clamping purposes. A pulley 69 is secured to the right hand end of roller 39, as one views the machine in FIGURE 1, and is driven by a belt 71. Belts 63 and 71 are driven by a gear 72 mounted above them at the right hand end of the machine (FIGURE 10), this gear in turn being driven by a gear 73.

Figure 3:
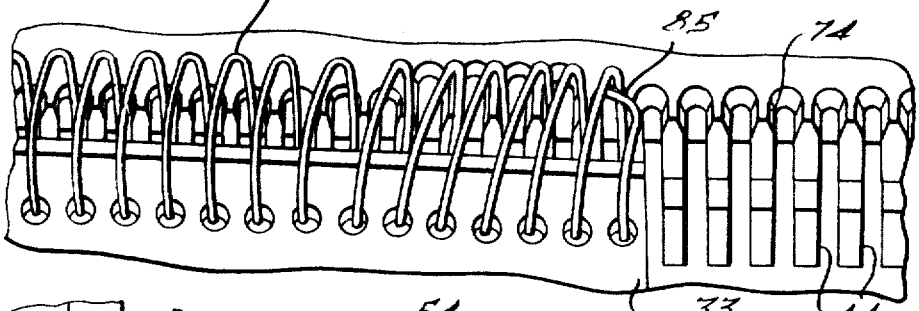
FIGURE 3 is a fragmentary perspective view showing the manner in which the spiral wire is guided by the rear guide roller support.

The upper ends of slots 66 are flared in an upward direction as indicated at 74 in FIGURES 3 and 8. The purpose of these flared entrances for slots 66 is to better receive the leading end of the spiral wire.

Figure 9:
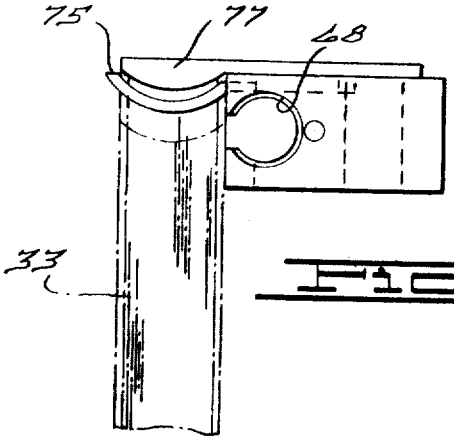
FIGURE 9 is a side elevational view of the rear guide roller support showing the hook and locating member for the stack.

A hook shown in dot-dash lines at 75 is securable to the left hand end of rear guide roller support 37, as seen in FIGURE 8, this hook being for the purpose of supporting the left hand end of pack 33, as seen in FIGURE 9. A recess 76 is provided in the top of member 37 for mounting hook 75. A pack locating member or stop 77 may be provided near the right hand end of member 37, mounted on the top surface thereof and extending forwardly over the location of the pack, as seen in FIGURE 9. Clearance slots 78 are provided in stop 77 for the spiral wire. The purpose of member 77 is to locate the right hand end of a pack that is ready for clamping. The operator first hangs the left hand end of the pack on hook 75 by inserting the hook through the left hand perforations, and then swings the pack upwardly (counterclockwise in FIGURE 1) until its right hand end engages member 77. This member would of course be adjusted to the left or right depending on the length of the stack of pages, and is contoured to cause the pack to conform to the spiral curvature. In other instances, the presence of member 77 may be eliminated and the operator may locate the stack in position for clamping merely by hanging the left hand end on hook 75 and visually aligning the remainder of the pack with member 37.

The slots 58 and 66 of members 36 and 37 are sufficiently deep to expose almost one-half of rollers 38 and 39, so that these rollers may effectively engage the spiral wire.

In operation, members 36 and 37 will be adjusted axially (that is, to the left or right in FIGURE 1) to accommodate the lead or pitch of the spiral wire, as determined by tool 29. Moreover, handle 51 will be adjusted to determine the clamping position of member 36 by moving screw 48. Member 37 may also be adjusted forwardly or rearwardly for this purpose.

The adjustment of member 36 may be accomplished by adjustably securing sleeve 33 on shaft 42. The axial and forward or rearward adjustment of member 37 may be accomplished by bolt-and-slot connections between members 37 and 41.

With member 36 in its retracted position, a pack 33 will be mounted on hook 75 and held in position against surface 57 of member 37, either by holding the right hand end of the pack up against stop 77 or by visual alignment. Cam 47 will then be rotated to permit spring 46 to swing member 36 downwardly and rearwardly until it clamps pack 33 in position, those areas of the pack adjacent perforations 79 being clamped between surfaces 57 and 66 of members 36 and 37 respectively. When member 36 swings down to its clamping position, member 56 will also swing down to its operative position, so as to limit upward movement of the spiral as it leaves tool 29.

As the spiral wire issues from tool 29, it will be fed through perforations 79 by the rapidly rotating rollers 38 and 39. The advancing spiral will pass through slots 58 to be engaged by roller 38 and through slots 66 to be engaged by roller 39. In the illustrated embodiment, the spiral (which is indicated at 81 in FIGURES 2 and 3) will rotate clockwise in FIGURE 2 as shown by the arrow. This will mean that the leading end will enter flared entrances 74 and slots 66 to be engaged by roller 39 and will leave perforations 79 to enter slots 58 and be engaged by roller 38.

When spiral 81 has been fed to the entire pack 33, it will engage means which will cause the feed to be stopped, in a manner described below.

At this point, while the book is still being clamped by members 36 and 37, knife mechanisms 83 and 84 (FIGURES 1 and 4) will operate to sever and properly crimp the opposite ends of spiral 81. A right hand crimped end is indicated at 85 in FIGURE 3, for illustrative purposes. However, the knife mechanism does not form part of the present invention, and therefore need not be described in detail. Cam 53 will then again be rotated to lift member 36 and guide 56 to their retracted positions, so that the bound pack 33 may be removed from the mechanism.

It will thus be seen that members 36 and 37 perform the multiple functions of rotatably supporting the guide rollers, locating the pack in position for clamping, and actually clamping the pack in wide areas adjacent and on opposite sides of the row of perforations. The arrangement may be easily adjusted for various sizes of spirals, utilizing if desired the adjustable feature of tool 29 described in the aforementioned copending application. The result will be faster loading and unloading of the packs, more rapid feeding of the spiral, and less down time for adjustment or maintenance. This in turn will result in much higher production rates for producing spiral-bound packs of perforated sheets and covers.

Figure 11:
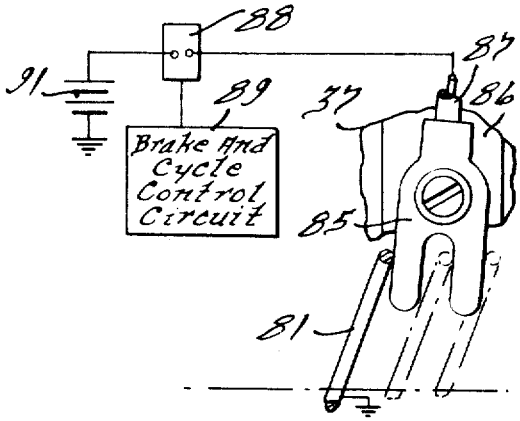
FIGURE 11 is a circuit diagram showing the manner in which the spiral wire is used to actuate the feed stopping means.

The means for causing the feed to be stopped comprises a contact 85 secured to the top of the right-hand end of member 37, as seen in FIGURES 7 and 11. An insulating member 86 separates contact 85 from member 37. The contact comprises a two-pronged member disposed above slots 66 and engageable by the leading turns of spiral 81 after it has passed completely through pack 33. A wire 87 connects contact 85 with a relay 88 which in turn controls a brake and cycle control circuit schematically indicated at 89. This brake and cycle control circuit may be of a conventional nature and need not be described in detail, but it will serve to stop the feed of spiral 81 and carry out the remaining portions of the cycle. A source of electricity 91 is connected in series with relay 88 and, through ground, with spiral 81.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In a spiral binder applying machine for packs of sheets each of which *has* a row of perforations, forward and rear guide rollers, forward and [read] *rear* guide roller supports, each of said supports comprising an elongated member within which its guide roller is rotatably supported, means mounting said members in facing relation, the facing surfaces of said members being flat and engageable with opposite sides of a pack of perforated sheets in areas adjacent and on both sides of the row of perforations, means for moving said members relative to each other between retracted and clamping positions, a series of slots in the facing surfaces of said members, said slots extending into said members sufficiently to expose said rollers, and means for rotating said rollers, whereby a spiral wire will pass into and out of successive slots in said members and be advanced by said rollers.

2. The combination according to claim 1, said machine being further provided with an upright frame, said rear support member being stationarily mounted on said frame and said forward support member being swingably mounted on an axis above said stationary support member for movement between retracted and clamping positions.

3. The combination according to claim 2, further provided with a coiling tool, and an upper spiral wire limiting shoe mounted for swinging movement with said forward support member between retracted and advanced positions, said shoe when in its advanced position being above the exit end of said tool to limit upward movement of the spiral wire.

4. The combination according to claim 2, further provided with a hook secured to one end of said stationary support and adapted to enter the perforations at one end of a pack of sheets to be bound.

5. The combination according to claim 4, further provided with a contoured locating stop mounted at the other end of said stationary support, whereby a pack supported at one end by said hook may be swung upwardly into engagement with said locating stop and its perforated edge contoured to conform to the curvature of sad spiral wire, the stop having clearance slots for said spiral wire.

6. The combination according to claim 2, further provided with adjustable means for actuating said movable support member between its retracted and clamping positions, said adjustable means including a rotatable cam and a member of adjustable length connected to said swingable support and engageable with said cam.

7. The combination according to claim 1, the slots in one support member being flared at one end thereof, whereby the leading end of a spiral wire will be guided into said slots.

8. The combination according to claim 1, further provided with a contact mounted on one of said members above the slots thereof and engageable by said spiral wire after it has passed through the perforations in a pack of sheets, a brake and cycle control circuit for said machine, and a relay connected to said contact and controlling said brake and cycle control circuit to stop the feed of said spiral wire in response to engagement of said contact by the spiral wire.

*9. In a spiral binder applying machine for packs of sheets each of which has a row of perforations, forward and rear elongated members, means mounting said members in facing relation, facing surfaces of said members being flat and engageable with opposite sides of a pack of perforated sheets in areas adjacent and on both sides of the row of perforations, means for moving said members relative to each other between retracted and clamping positions, a series of slots in the facing surfaces of said members, at least one of said members acting as a guide roller support, a guide roller within said guide roller support and rotatably supported thereby, the slots in the member which acts as a guide roller support extending into said member sufficiently to expose said roller, and means for rotating said roller, whereby a spiral wire will pass into and out of successive slots in said members and be advanced by said roller.*

(References on following page)

References Cited

The following references, cited by the Examiner, are of record in the patented file of this patent or the original patent.

UNITED STATES PATENTS

| | | | |
|---|---|---|---|
| 482,965 | 9/1892 | Jackson | 140—92.93 |
| 673,588 | 5/1901 | Templin | 140—92.93 |
| 2,177,054 | 10/1939 | Catini | 140—92.93 |
| 2,961,012 | 11/1960 | Freundlich | 140—92.93 |

FOREIGN PATENTS

| | | |
|---|---|---|
| 366,030 | 1/1963 | Switzerland. |

LOWELL A. LARSON, Primary Examiner